United States Patent
Tamogami et al.

(10) Patent No.: US 11,485,883 B2
(45) Date of Patent: Nov. 1, 2022

(54) AQUEOUS BONDING COMPOSITION

(71) Applicant: HENKEL AG & CO. KGAA, Duesseldorf (DE)

(72) Inventors: Tsuyoshi Tamogami, Osaka (JP); Yoshio Yoshida, Osaka (JP); Tadashi Hayakawa, Osaka (JP)

(73) Assignee: HENKEL AG & CO., KGaA, Duesseldorf (DE)

( * ) Notice: Subject to any disclaimer, the term of this patent is extended or adjusted under 35 U.S.C. 154(b) by 247 days.

(21) Appl. No.: 16/693,736

(22) Filed: Nov. 25, 2019

(65) Prior Publication Data
US 2020/0199416 A1 Jun. 25, 2020

Related U.S. Application Data

(63) Continuation of application No. PCT/JP2018/017522, filed on May 2, 2018.

(51) Int. Cl.
*C09J 105/00* (2006.01)
*C04B 26/28* (2006.01)
(Continued)

(52) U.S. Cl.
CPC ............ *C09J 105/00* (2013.01); *C04B 26/28* (2013.01); *C04B 2111/00637* (2013.01); *C04B 2111/52* (2013.01)

(58) Field of Classification Search
CPC ..... C09B 13/06; C09B 65/00; C09B 67/0079; C09B 67/009; C09B 11/24; C09B 19/00; C09B 57/00; C09B 57/02; C09J 133/068; C09J 133/14; C09J 165/00; C09J 153/00; C09K 17/18; C09K 17/32; C09K 17/40;
(Continued)

(56) References Cited

U.S. PATENT DOCUMENTS 5,580,941 A * 12/1996 Krause ................ C09D 151/02
527/300
8,674,021 B2 3/2014 Rodrigues et al.
(Continued)

FOREIGN PATENT DOCUMENTS

CA 2771321 A1 * 2/2011 ............... C08G 8/10
CN 101821212 A 9/2010
(Continued)

OTHER PUBLICATIONS

PubChem: Ammonium sulfate [online], [retrieved on Feb. 19, 2022], Retrieved from the Internet < URL: https://pubchem.ncbi.nlm.nih.gov/compound/Ammonium-sulfate#:~:text=Ammonium%20sulfate%20is%20an%20inorganic,a%20fertilizer%20for%20alkaline%20soils> (Year: 2022).*

*Primary Examiner* — Coris Fung
*Assistant Examiner* — Ritu S Shirali
(74) *Attorney, Agent, or Firm* — Sun Hee Lehmann

(57) ABSTRACT

Disclosed is an aqueous bonding composition comprising: (A) a modified saccharide which is a product of (a) a saccharide and (b) a radical initiator. The composition further preferably comprises a structure based on (c) an amine. The composition further preferably comprises (B) an inorganic acid salt. The formaldehyde-free aqueous bonding composition can contribute to an improvement in mechanical properties such as strength and elastic modulus of a molded article, compared to a formaldehyde-containing phenol resin composition.

4 Claims, 9 Drawing Sheets

(51) Int. Cl.
*C04B 111/00* (2006.01)
*C04B 111/52* (2006.01)

(58) Field of Classification Search
CPC .......... C08L 5/00; C07H 21/00; C07H 19/10;
C07H 19/06; C07H 23/00; C07H 3/00;
C07H 5/06; C07H 19/073; C07H 19/173;
C07H 21/04; C08B 1/00; C08B 15/00;
C08B 37/00; C08B 37/003; C13K 1/02
See application file for complete search history.

(56) References Cited

U.S. PATENT DOCUMENTS

| | | | |
|---|---|---|---|
| 2007/0015678 A1* | 1/2007 | Rodrigues | C11D 3/228 510/320 |
| 2008/0020948 A1 | 1/2008 | Rodrigues et al. | |
| 2010/0330376 A1 | 12/2010 | Trksak et al. | |
| 2012/0053338 A1 | 3/2012 | Skuratowicz | |

FOREIGN PATENT DOCUMENTS

| | | | | |
|---|---|---|---|---|
| CN | 103608369 A | * | 2/2014 | ......... C04B 24/2641 |
| CN | 103608369 A | | 2/2014 | |
| CN | 104152085 A | | 11/2014 | |
| CN | 104395453 A | | 3/2015 | |
| CN | 106458739 A | | 2/2017 | |
| JP | 5628889 B2 | | 10/2014 | |
| JP | 5931901 B1 | | 5/2016 | |
| JP | 6062099 B1 | | 12/2016 | |
| KR | 101595275 B1 | | 2/2016 | |
| RU | 2011135232 | | 2/2013 | |
| RU | 2488606 C2 | | 7/2013 | |
| WO | 2009019235 A1 | | 2/2009 | |
| WO | 2012072938 A1 | | 6/2012 | |
| WO | 2013021112 A1 | | 2/2013 | |
| WO | 2015072437 A1 | | 5/2015 | |
| WO | 2017072186 A1 | | 5/2017 | |

* cited by examiner

AQUEOUS BONDING COMPOSITION

FIELD OF THE INVENTION

The present invention relates to an aqueous bonding composition capable of producing an aqueous adhesive, and a molded body (or molded article) which is producible by using the aqueous bonding composition.

BACKGROUND OF THE INVENTION

A phenol resin composition has hitherto been employed as a composition to be used for production of molded bodies such as insulating materials, soundproofing materials, and wood board products by using inorganic fibers such as glass wool, rock wool, and ceramic fiber, because the phenol resin composition has excellent performances such as mechanical strength, and low cost.

In the case of producing a molded article using inorganic fibers, the composition is adhered to the inorganic fibers, and the inorganic fibers with the composition is molded into a shape of the objective molded body, and then the composition is cured by heating to obtain the objective molded article.

Heretofore, a formaldehyde-containing phenol resin composition has widely been used as the composition. In recent years, however, environmental standards have become more severe, thus requiring a composition using no formaldehyde.

JP 5931901 B1, JP 5628889 B1, and JP 6062099 B1 disclose, as the composition using no formaldehyde, a composition which contains a saccharide as a main component and is mixed with a polycarboxylic acid ammonium salt or an inorganic acid ammonium salt.

JP 5931901 B1 discloses a formaldehyde-free sizing agent composition for mineral fiber, comprising at least one non-reducing saccharide, at least one inorganic acid ammonium salt, additives, and water (see JP 5931901 B1, claim 1, etc.).

JP 5628889 B1 discloses a method for producing an insulating or soundproof fiber glass product, wherein the method comprises a step of spraying a formaldehyde-free aqueous binder solution onto a fiber mat, the aqueous binder solution contains a Maillard reaction product, and the Maillard reaction product is selected from (i) an amine reaction product composed of a polycarboxylic acid ammonium salt and (ii) one or more carbohydrate reaction products including one or more reducing saccharides (see, JP 5628889 B1, claims 1 to 5, etc.).

JP 6062099 B1 discloses a binder composition comprising a non-reducing saccharide, an unsaturated monocarboxylic acid salt, and an inorganic acid ammonium salt (see JP 6062099 B1, claim 1, etc.). JP 6062099 B1 discloses that this binder composition is adhered to inorganic fibers and the inorganic fibers are aggregated to obtain an aggregate, and then the aggregate is molded into a predetermined shape corresponding to a desired molded body, followed by thermally curing the binder composition and further cooling the binder composition to obtain the molded body (see JP 6062099 B1, claim 10, [0057] to [0067], etc.).

SUMMARY OF THE INVENTION

When a conventional composition using no formaldehyde is used for production of a molded body, the composition was sometimes inferior in strength and elastic modulus after thermal curing, compared to a formaldehyde-containing phenol resin composition.

From environmental point of view, the compositions of JP 5931901 B1, JP 5628889 B1, and JP 6062099 B1 are preferable because of being formaldehyde-free. However, it is difficult for the compositions to sufficiently improve mechanical properties (for example, tensile elastic modulus and tensile strength) of an inorganic fiber molded article and a wood-based molded article.

Furthermore, the compositions of JP 5931901 B1, JP 5628889 B1, and JP 6062099 B1 sometimes decrease production efficiency of the inorganic fiber molded article and wood-based molded article because of low curing rate. The molded article thus produced sometimes easily absorbs moisture in air, thus requiring an improvement in water resistance.

In light of these circumstances, the present invention has been made and an object thereof is to provide a formaldehyde-free aqueous bonding composition which can contribute to an improvement in mechanical properties such as strength and elastic modulus of a molded article, compared to a formaldehyde-containing phenol resin composition, and is to provide a molded article obtained by using the aqueous bonding composition.

As a result of continued intensive studies, the present researchers have found that an aqueous bonding composition can be obtained by modifying a saccharide with a radical initiator, which composition contributes to an improvement in mechanical properties of a molded article even if formaldehyde is not included. Furthermore, they have found that, when a saccharide is modified with a radical initiator in the presence of an amine, the aqueous bonding composition thus obtained achieves an increased curing rate and is useful for efficient production of a molded article, so that not only mechanical properties of the molded article are improved, but also water resistance is improved to a higher level. Thus, the present invention has been completed.

The present invention provides, in an aspect, an aqueous bonding composition comprising: (A) a modified saccharide which is a product of (a) a saccharide and (b) a radical initiator.

The present invention provides, in an embodiment, an aqueous bonding composition, wherein the saccharide (a) comprises (A) a modified saccharide treated with (b) a radical initiator.

The present invention provides, in another embodiment, an aqueous bonding composition further comprising a structure based on (or derived from) (c) an amine.

The present invention provides, in a preferred embodiment, an aqueous bonding composition further comprising (B) an inorganic acid salt.

The present invention provides, in a further embodiment, an aqueous bonding composition, wherein the radical initiator (b) comprises a peroxide.

The present invention provides, in another preferred embodiment, an aqueous bonding composition, wherein the amine (c) comprises ammonia.

The present invention provides, in further another embodiment, an aqueous bonding composition, wherein the inorganic acid salt (B) comprises an inorganic acid ammonium salt.

The present invention provides, in another aspect, a method for producing an aqueous bonding composition, which comprises the following step (i):
(i) a step of reacting (a) a saccharide with (b) a radical initiator to produce (A) a modified saccharide.

The present invention provides, in a preferred embodiment, a method for producing an aqueous bonding composition, which comprises the following step (ii):

(ii) a step of reacting (a) a saccharide with (b) a radical initiator in the presence of (c) an amine to produce (A) a modified saccharide.

The present invention provides, in a further embodiment, a method for producing an aqueous bonding composition, which further comprises the following step (iii):

(iii) a step of mixing the modified saccharide with an inorganic acid salt.

The present invention provides, in a preferred aspect, a molded article (molded body or molded product) comprising a cured material of the aqueous bonding composition.

Advantageous Effects of Invention

The aqueous bonding composition according to the embodiments of the present invention comprises (A) a modified saccharide which is a product of (a) a saccharide and (b) a radical initiator, so that the curing rate increases, thus making it possible to contribute to efficient production of a coated or sprayed material. Furthermore, when (a) a saccharide is reacted with (b) a radical initiator in the presence of (c) an amine to produce (A) a modified saccharide, the curing rate of the aqueous bonding composition of the present invention further increases.

When a material coated or sprayed with the aqueous bonding composition of the present invention is processed, molded and cured, tensile strength and tensile elastic modulus of a thus obtained molded article (molded body or molded product) are improved and water resistance of the molded article is improved, thus allowing the molded article to hardly absorb moisture in air.

Considering properties of a molded article comprising a cured material, the aqueous bonding composition of the present invention is useful for production of various molded articles and is most suitable for production of a molded article comprising a inorganic fiber and a molded article comprising a wood-based material.

DETAILED DESCRIPTION OF THE INVENTION

Figure 1:
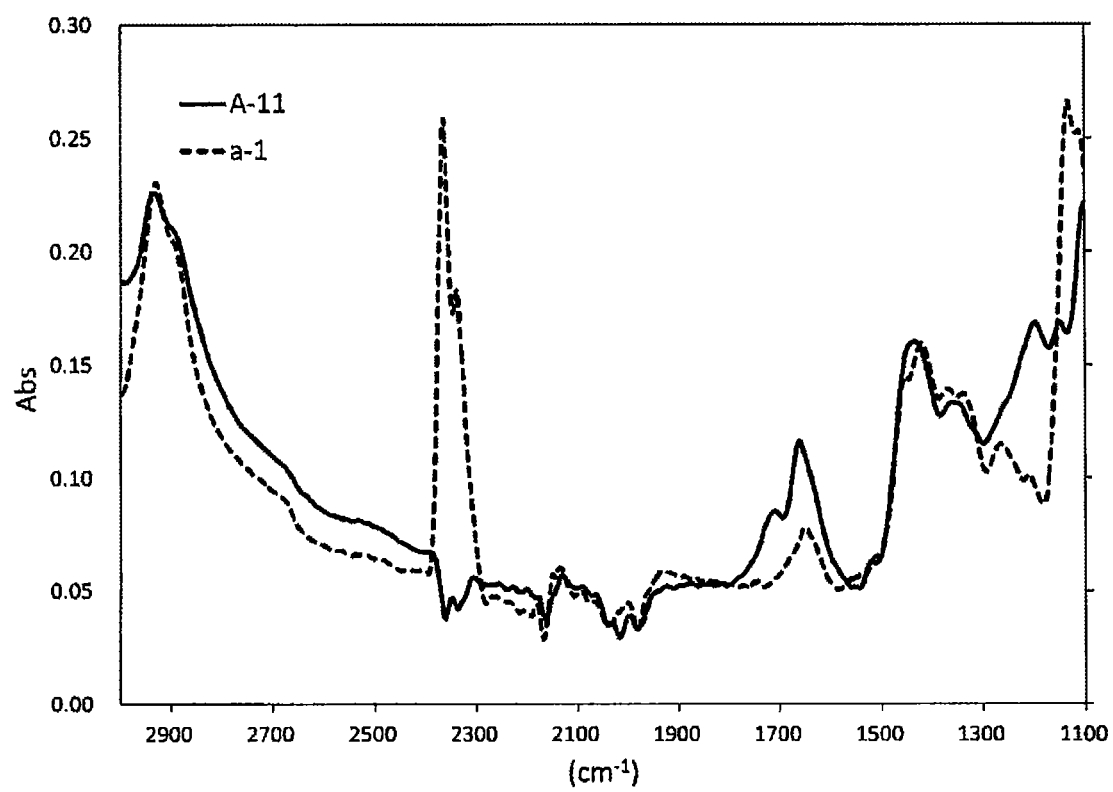
FIG. 1 shows infrared absorption spectra (IR) of (A-11) a modified saccharide and (a-1) sucrose comprised in an aqueous bonding composition of the present invention.

An aqueous bonding composition of the present invention comprises (A) a modified saccharide.

The modified saccharide (A) is a product in which a chemical structure of (a) a saccharide is modified with (b) a radical initiator (in an aqueous medium, if necessary).

In general, the saccharide (a) can take two structures, for example, a linear (open chain) structure having a hydroxy group and a carbonyl group (aldehyde or ketone) and a cyclic structure of a cyclic acetal (or ketal) incorporating its own hydroxy group. It is presumed that the modified saccharide (A) comprises a compound having further increased molecular weight obtainable by ring-opening and converting the cyclic acetal structure of the saccharide (a) into a linear structure by using (b) the radical initiator.

The "(a) saccharide" as used herein is generally called a saccharide and is not particularly limited as long as the objective aqueous bonding composition of the present invention can be obtained. Examples of the saccharide (a) comprise monosaccharide, disaccharide, trisaccharide, tetrasaccharide, polysaccharide, and other oligosaccharides.

Specific examples of the "monosaccharide" include the followings:

hexoses such as glucose, psicose, fructose, sorbose, tagatose, allose, altrose, mannose, gulose, idose, galactose, talose, fucose, fuculose, and rhamnose;
  trioses such as ketotriose (dihydroxyacetone) and aldotriose (glyceraldehyde);
  tetroses such as erythrulose, erythrose, and threose; and
  pentoses such as ribulose, xylulose, ribose, arabinose, xylose, lixose, and deoxyribose.

Examples of the "disaccharide" include sucrose, lactose, maltose, trehalose, turanose, and cellobiose.

Examples of the "trisaccharide" include raffinose, melezitose, maltotriose, and 1-kestose (GF2).

Examples of the "tetrasaccharide" include acarbose, stachyose, and nystose (GF3).

Examples of the "polysaccharide" include glycogen, starch (amylose, amylopectin, etc.), cellulose, dextrin, glucan, N-acetylglucosamine, chitin, and inulin (including fructofuranosylnystose: GF4).

Examples of the "other oligosaccharides" include fructooligosaccharide, galactooligosaccharide, and mannan oligosaccharide.

These "saccharides" can be used alone or in combination.

The "(a) saccharide" preferably comprises a structure based on (or derived from) sucrose. The sucrose is a saccharide formed by combining glucose and fructose, and the glucose and fructose are produced when the saccharide is hydrolyzed.

The aqueous bonding composition of the present invention is excellent in mechanical properties such as tensile strength and tensile elastic modulus when the saccharide (a) comprises the sucrose.

The saccharide (a) can further comprise, for example, sugar syrup. The "sugar syrup" means syrup prepared by removing dietary fibers and impurities from a sugar raw material such as sugarcane, sugar beet, sugar maple, and Palmyra palm, or means a viscous liquid (a molasses)

obtainable when sugar is purified from a raw material, which viscous liquid also comprises a component other than sugar.

The sugar syrup comprises, for example, waste molasses, ice molasses, white honey, caramel, crude saccharide, sugar solution, and juices of the sugar raw material (sugarcane, sugar beet, sugar maple, and Palmyra palm).

The sugar syrup preferably comprises at least one selected from waste molasses, ice molasses, and crude saccharide.

As used herein, (b) the radical initiator refers to a compound which can generate radicals under a mild reaction condition so as to allow a radical reaction to proceed. Radicals mean atoms, molecules or ions having unpaired electrons. Radicals are generally called free radicals.

The radical initiator is not particularly limited as long as the object of the present invention is not impaired, and comprises, for example, an azo compound and a peroxide.

The azo compound is a compound having an azo group (R—N=N—R') which is decomposed by heat and/or light to generate a carbon radical. Specific examples thereof include 2,2'-azobisbutyronitrile (AIBN).

The peroxide is roughly classified into an organic peroxide, an inorganic peroxide, and hydrogen peroxide.

The organic peroxide is a compound comprising a peroxide structure (—O—O—) and typically comprises, for example, benzyl peroxide.

The inorganic peroxide is a compound comprising peroxide ion (O22-), and specific examples thereof comprise ammonium persulfate, sodium persulfate, potassium persulfate, and the like.

The hydrogen peroxide is a compound represented by the chemical formula $H_2O_2$.

Considering solubility in an aqueous medium and compatibility with the saccharide (a), the radical initiator (b) preferably comprises a peroxide in the present invention.

The amine (c) as used herein is a generic term comprising ammonia and amines.

Ammonia is an inorganic compound whose molecular formula is represented by $NH_3$ and is a gas which is colorless at normal temperature and normal pressure.

The amine is a generic term of a compound in which a hydrogen atom of ammonia is substituted with a substituent such as a hydrocarbon group and an aromatic group. The amine is a primary amine when one hydrogen atom is substituted, a secondary amine when two hydrogen atoms are substituted, or a tertiary amine when three hydrogen atoms are substituted. Furthermore, a substituent is combined with the tertiary amine to form a quaternary ammonium cation.

The amine is roughly classified into an aliphatic amine, an aromatic amine, and a heterocyclic amine.

Examples of the aliphatic amine include methylamine, dimethylamine, trimethylamine, ethylamine, diethylamine, triethylamine, ethylenediamine, triethanolamine, hexamethylenediamine, and the like.

Examples of the aromatic amine include aniline, phenethylamine, toluidine, catecholamine, and the like.

Examples of the heterocyclic amine include pyrrolidine, piperazine, piperidine, morpholine, pyrrole, pyrazole, imidazole, pyridine, pyridazine, pyrimidine, oxazole, thiazole, and the like.

In the aqueous bonding composition of the present invention, the amine (c) preferably comprises ammonia. When the amine (c) comprises ammonia, mechanical properties (tensile strength, tensile elastic modulus) of a molded article comprising a cured material of the aqueous bonding composition are improved.

The aqueous bonding composition of the present invention preferably comprises (B) an inorganic acid salt. When comprising the inorganic acid salt (B), the curing rate of the aqueous bonding composition of the present invention increases, thus making it possible to improve mechanical properties such as tensile strength and tensile elastic modulus of a molded article.

The inorganic acid salt (B) as used herein is not particularly limited as long as the object of the present invention is not impaired, and preferably comprises at least one selected from ammonium salts, potassium salts, calcium salts, sodium salts, and magnesium salts, and most desirably comprises inorganic acid ammonium salts. When comprising the inorganic acid ammonium salt, the aqueous bonding composition of the present invention achieves more excellent curing rate, thus making it possible to further improve mechanical properties such as tensile strength and tensile elastic modulus of a molded article.

The "(B) inorganic acid ammonium salt" is generally called an ammonium salt of an inorganic acid and is not particularly limited as long as the objective aqueous bonding composition of the present invention is obtainable.

Examples of the "inorganic acid ammonium salt" include ammonium sulfate, ammonium hydrogen sulfate, ammonium halide (for example, ammonium chloride, ammonium fluoride, ammonium bromide, ammonium iodide, etc.), ammonium phosphate, ammonium hydrogen phosphate, and ammonium dihydrogen phosphate.

The "inorganic acid ammonium salt" is preferably at least one selected from ammonium sulfate, ammonium chloride, ammonium hydrogen phosphate, and ammonium dihydrogen phosphate.

When the "(B) inorganic acid ammonium salt" is at least one selected from ammonium sulfate, ammonium chloride, ammonium hydrogen phosphate, and ammonium dihydrogen phosphate, the aqueous bonding composition of the present invention has more excellent curability, thus making it possible to further improve physical properties (mechanical properties such as tensile strength and tensile elastic modulus) of a molded article.

The "inorganic acid ammonium salt(s)" can be used alone or in combination.

It is possible to use commercially available products as the "inorganic acid ammonium salt".

In the present invention, in addition to the "inorganic acid ammonium salt", the inorganic acid salt (B) can comprise an inorganic acid metal salt, and can comprise at least one selected from potassium salts, calcium salts, sodium salts, and magnesium salts.

Specific examples of the "inorganic acid metal salt" include:

potassium salts such as potassium sulfate, potassium hydrogen sulfate, potassium halide (for example, potassium fluoride, potassium chloride, potassium bromide, and potassium iodide), potassium phosphate, potassium hydrogen phosphate, and potassium dihydrogen phosphate;

calcium salts such as calcium sulfate, potassium hydrogen sulfate, calcium halide (for example, calcium fluoride, calcium chloride, calcium bromide, and calcium iodide), calcium phosphate, calcium hydrogen phosphate, and calcium dihydrogen phosphate;

sodium salts such as sodium sulfate, sodium hydrogen sulfate, sodium halide (for example, sodium fluoride, sodium chloride, sodium bromide, and sodium iodide), sodium phosphate, sodium hydrogen phosphate, and sodium dihydrogen phosphate; and magnesium salts such as magnesium sulfate, magnesium hydrogen sulfate, magnesium halide (for example, magnesium fluoride, magnesium chloride, magnesium bromide, and magnesium iodide), magnesium phosphate, magnesium hydrogen phosphate, and magnesium dihydrogen phosphate.

In the present invention, it is particularly preferred that the "inorganic acid metal salt" comprises at least one selected from potassium sulfate, potassium chloride, calcium sulfate, calcium chloride, sodium sulfate, sodium chloride, magnesium sulfate, and magnesium chloride.

When the "inorganic acid metal salt" comprises at least one selected from potassium sulfate, potassium chloride, calcium sulfate, calcium chloride, sodium sulfate, sodium chloride, magnesium sulfate, and magnesium chloride, a molded article produced by using the aqueous bonding composition of the present invention can be cured by heating and pressurizing at a lower temperature for a shorter time, thus making it possible to further increase tensile strength and tensile elastic modulus.

The "inorganic acid metal salt" comprises most preferably magnesium chloride. When comprising magnesium chloride, the molded article produced by using the aqueous bonding composition of the present invention can be cured by heating and pressurizing at a lower temperature for a shorter time, thus making it possible to further increase the tensile strength and the tensile elastic modulus.

When the aqueous bonding composition of the present invention comprises (A) a modified saccharide and (B) an inorganic acid salt, the amount of the inorganic acid salt (B) is preferably in a range of 1.5 to 15.0 parts by weight, and particularly preferably 1.5 to 4.5 parts by weight, based on 100 parts by weight (in terms of the solid content) of the total weight of the components (A) and (B). When the amount of each of the components (A) and (B) is in the above range, the aqueous bonding composition of the present invention is excellent in balance between curing rate and water resistance, and tensile strength and tensile elastic modulus of a molded article of the present invention are improved and the water resistance thereof is also improved, thus allowing the molded article to hardly absorb moisture in air.

The aqueous bonding composition according to the present invention has a form in which the above-mentioned components (A) and (B) and other components are dissolved or dispersed in water (form of a solution, a suspension, or a dispersion), and is applied onto various materials (for example, inorganic fiber, wood-based material), a base material, an adherend, and the like, is molded and then cured.

The "water" as used herein is generally called "water" and is not particularly limited as long as the objective aqueous bonding composition of the present invention is obtainable. Examples thereof can include distilled water, deionized water, pure water, tap water, and industrial water.

The amount of the water comprised in the aqueous bonding composition according to embodiments of the present invention is not particularly limited and is appropriately selected according to the components (A) to (B) to be used as well as optional components and additives as long as the objective aqueous bonding composition of the present invention is obtainable.

The aqueous bonding composition according to the present invention is in a form of a solution, a suspension, or a dispersion, so that it is easy to apply or spray onto various materials (for example, inorganic fiber, wood-based material), a base material, an adherend, and the like. Furthermore, the aqueous bonding composition according to the present invention is excellent in protection of the earth environment, and protection of the work environment of workers because no organic solvent is preferably used.

The aqueous bonding composition according to embodiments of the present invention can comprise other components. Examples of the component include a storage stabilizer, a mechanical property improving agent, a thickener, a preservative, a mildew-proofing agent, a rust preventive, and a dispersion stabilizer.

Examples of the storage stabilizer include polycarboxylic acids such as citric acid, malic acid, tartaric acid, succinic acid, erythorobic acid, and the like.

Examples of the mechanical property improving agent include vinyl-based polymerizable monomers having reactivity in the side chain, such as (meth)acrylic acid, maleic acid, (meth)acrylamide, acrylonitrile, hydroxyethyl (meth)acrylate, furfuryl alcohol, glycidyl (meth) acrylate, and the like.

The thickener is used to prevent the viscosity of the composition from decreasing in the case of pressurizing and heating and is not particularly limited as long as the objective aqueous bonding composition of the present invention is obtainable. The thickener is classified, for example, into an organic thickener and an inorganic thickener.

Examples of the inorganic thickener can include clay, talc, silica, and the like.

Examples of the organic thickener can include natural thickeners such as carboxymethyl cellulose, vegetable flours such as wheat flour, cornstarch, top-grade rice flour, walnut flour and coconut flour, and synthetic thickeners such as polyvinyl alcohol and polyvinylpyrrolidone, and the like.

These thickeners can be used alone or in combination.

A method for producing an aqueous bonding composition of the present invention comprises a step (i):
(i) a step of reacting (a) a saccharide with (b) a radical initiator to produce (A) a modified saccharide.

When (c) an amine is used in the case of producing the modified saccharide (A), the method for producing an aqueous bonding composition of the present invention comprises a step (ii):
(ii) a step of reacting (a) a saccharide with (b) a radical initiator in the presence of (c) an amine to produce (A) a modified saccharide.

The method for producing an aqueous bonding composition of the present invention further comprises the following step (iii):
(iii) a step of mixing (A) the modified saccharide with an inorganic acid salt.

When the method for producing an aqueous bonding composition of the present invention comprises the step (iii), tensile strength and tensile elastic modulus of a molded article can be further improved.

The aqueous bonding composition according to embodiments of the present invention can be produced by adding the above-mentioned components (A) to (B), water and, if necessary, other component(s), followed by stirring. There is no particular limitation on the order of adding the respective components (A) to (B), water, and other component(s), the method of adding the respective components and water, and the method of stirring, and so on, as long as the objective aqueous bonding composition of the present invention is obtainable.

Examples of materials obtained by using the aqueous bonding composition of the present invention include molded articles obtained by molding materials such as inorganic fiber, calcium silicate, gypsum, rock wool, concrete, cement, mortar, and slate into various forms (plate, block, etc.).

Examples of the inorganic fiber include, but are not limited to, rock wool, stone wool, mineral wool, glass wool, mineral glass wool, and the like.

In the present invention, an inorganic fiber molded article is preferably produced by using these inorganic fibers alone or in combination. From the viewpoint of versatility, insulation properties, soundproofing properties, and the like, the glass wool or rock wool is preferably used as the inorganic fiber.

In the present invention, in addition to the inorganic fiber molded article, it is possible to provide a molded article such as a wood-based material and a mold by molding woods (wood chips, wood materials, etc.), molding sand, and the like by using the aqueous bonding composition according to the present embodiments.

The wood-based material according to the present invention may be a mixture of an aqueous bonding composition according to embodiments of the present invention and a wood-based element (raw material) (for example, fibers of wood-based or herbaceous plants, small pieces and veneers, etc.). The wood-based material is produced by applying or spraying the aqueous bonding composition according to embodiments of the present invention onto a wood-based element, and heating the wood-based element, leading to bonding of the wood-based element, followed by molding.

Examples of the wood-based element (raw material) include sawn boards, veneers, wood-based strands, wood-based chips, wood-based fibers and vegetable fibers, and the like obtainable, for example, by grinding woods.

Examples of the wood-based material include, for example, laminated woods, plywoods, particle boards, fiber boards, medium density fiberboard (MDF), and the like obtainable by bonding the wood-based element using an adhesive.

The aqueous bonding composition according to embodiments of the present invention can be used to bond various adherends (for example, inorganic fibers, papers, wood-based fibers, plywoods, etc.).

In the case of producing the molded article of the present invention, production conditions such as coating amount of the aqueous bonding composition, coating method, molding pressure, molding temperature, and molding time are appropriately selected according to the type, shape, and size of the molded article, and are not particularly limited as long as the objective wood-based material of the present invention is obtainable. Taking production efficiency of the molded article into consideration, the coating method is preferably a method of impregnating an inorganic fiber with the aqueous bonding composition, a method of spraying the aqueous bonding composition onto an inorganic fiber or wood-based elements using a spray and the like, or a method of coating the aqueous bonding composition using a roll and the like.

The molding pressure is preferably in a range of 0.5 to 6.0 MPa. If the molding pressure is 6.0 MPa or less, the molded article is scarcely degraded since too large pressure is not applied. If the molding pressure is 0.5 MPa or more, it is possible to satisfactorily bond constituent elements of the molded article.

The molding temperature is preferably in a range of 140 to 230° C., more preferably 140 to 200° C., and particularly preferably 140 to 180° C. If the molding temperature is 230° C. or lower, the temperature is not too high, low energy consumption is achieved, and also the molded article is scarcely degraded. If the molding temperature is 140° C. or higher, the bonding can proceed within an appropriate time.

The molding time is preferably in a range of 3 to 10 minutes, more preferably 3 to 9 minutes, and particularly preferably 3 to 7 minutes. If the molding time is 10 minutes or less, low energy consumption is achieved because the molding time is not too long, and also the molded article is scarcely degraded. If the molding time is 3 minutes or more, an appropriate bonding time is secured, thus making it possible to secure appropriate bonding.

The molded article thus obtained in the above-mentioned manner can be used for various applications, for example, building materials, furniture, etc., like a conventional molded article.

EXAMPLES

The present invention will be described below by way of Examples and Comparative Examples. However, it should be noted that each of these Examples is merely an embodiment of the present invention and the present invention is not limited thereto.

In the description of Examples, unless otherwise specified, parts by weight and percentages by weight are based on portions in which a solvent is not taken into consideration.

The following components were prepared as components of aqueous bonding compositions. Parts as used herein are by weight.

(a) Saccharide
 (a-1) Sucrose (manufactured by Wako Pure Chemical Industries, Ltd.)
 (a-2) Glucose (manufactured by Wako Pure Chemical Industries, Ltd.)
 (a-3) Fructose (manufactured by Wako Pure Chemical Industries, Ltd.)
(b) Radical initiator
 (b-1) Ammonium persulfate (manufactured by Mitsubishi Gas Chemical Company, Inc.)
 (b-2) Sodium persulfate (manufactured by Mitsubishi Gas Chemical Company, Inc.)
 (b-3) Aqueous 32.5% hydrogen peroxide (manufactured by Wako Pure Chemical Industries, Ltd.)
(c) Amine
 (c-1) Aqueous 25 weight % ammonia (manufactured by Wako Pure Chemical Industries, Ltd.)
 (c-2) Hexamethylenediamine (manufactured by Wako Pure Chemical Industries, Ltd.)
 (c-3) Piperazine hexahydrate (manufactured by Wako Pure Chemical Industries, Ltd.)
(B) Inorganic acid ammonium salt
 (B-1) Diammonium hydrogen phosphate (Wako Pure Chemical Industries, Ltd.)
 (B-2) Ammonium dihydrogen phosphate (Wako Pure Chemical Industries, Ltd.)
 (B-3) Ammonium sulfate (Wako Pure Chemical Industries, Ltd.) (B'-4) Ammonium citrate (Wako Pure Chemical Industries, Ltd.)
 (B'-5) Oleic acid (Wako Pure Chemical Industries, Ltd.)
<Production of (A) Modified Saccharides>
Production of (A-1) Modified Saccharide
 In a 2 liter reaction vessel, 409 g of water and 962 g of (a-1) sucrose were charged.

After the reaction vessel was equipped with a stirring blade, a condenser, and a thermometer, the reaction vessel was immersed in a hot bath at a temperature of 95° C., and then the mixture was stirred and heated to dissolve the sucrose (a-1).

Next, 38 g of (b-1) ammonium persulfate and 62 g of water were dissolved in another vessel to prepare a radical initiator solution (38% by weight). The radical initiator solution was charged into a dropping funnel and the reaction vessel was equipped with this dropping funnel.

After confirming that the temperature of the sucrose solution reached 90° C. or higher with stirring the sucrose aqueous solution in the reaction vessel, 100 g of the radical initiator solution was added dropwise to the sucrose solution from the dropping funnel over 4 hours. After the dropwise addition, the preparation in the reaction vessel was further stirred at a temperature of 90° C. or higher for 1 hour and cooled to 40° C. or lower to obtain an aqueous modified saccharide solution.

The aqueous solution of the modified saccharide included the radical initiator, and the solid component concentration (or solid content) was 68.0% by weight. The solid component concentration is calculated based on the total amount of the modified saccharide (A-1) and the ammonium persulfate (b-1) dissolved in the aqueous solution.

Production of (A-2) to (A-5) and (A-7) Modified Saccharides

Each of modified saccharides was produced by a method which was the same as that for producing the modified saccharide (A-1), except that each of radical initiator solutions (38% by weight) was prepared based on each of the compositions shown in Table 1.

Production of (A-6) Modified Saccharide

A modified saccharide (A-6) was produced by a method which was the same as that for producing the modified saccharide (A-1), except that a radical initiator solution was prepared with an aqueous 33% hydrogen peroxide based on the composition shown in Table 1.

Production of (A-8) to (A-14) Modified Saccharides

Based on each of the compositions shown in Table 2, water, (a) a saccharide, (b) a radical initiator, and (c) an amine were stirred to dissolve. Each of modified saccharides (A-8) to (A-12) and (A-14) was produced by a method which was the same as that for producing the modified saccharide (A-1). A modified saccharide (A-13) was produced by a method which was the same as that for producing the modified saccharide (A-6).

TABLE 1

| | | A-1 | A-2 | A-3 | A-4 | A-5 | A-6 | A-7 |
|---|---|---|---|---|---|---|---|---|
| (a) | (a-1) | 962 | 935 | 909 | 935 | | | |
| | (a-2) | | | | | 935 | 990 | |
| | (a-3) | | | | | | | 935 |
| (b) | (b-1) | 38 | 65 | 91 | | 65 | | 65 |
| | (b-2) | | | | 65 | | | |
| | (b-3) | | | | | | 10 | |
| Water | | 471 | 471 | 471 | 471 | 471 | 471 | 471 |

TABLE 2

| | | A-8 | A-9 | A-10 | A-11 | A-12 | A-13 | A-14 |
|---|---|---|---|---|---|---|---|---|
| (a) | (a-1) | 926 | 917 | 917 | 901 | | | |
| | (a-2) | | | | | 926 | 980 | |
| | (a-3) | | | | | | | 926 |
| (b) | (b-1) | 6 | 64 | 64 | 90 | 65 | | 65 |
| | (b-2) | | | | | | | |
| | (b-3) | | | | | | 10 | |
| (c) | (c-1) | 9 | | | 9 | 9 | 10 | 9 |
| | (c-2) | | 18 | | | | | |
| | (c-3) | | | 18 | | | | |
| Water | | 471 | 471 | 471 | 471 | 471 | 471 | 471 |

The difference in structure between (A) the modified saccharides and (a) the saccharides was proved by analytical instruments.

Specifically, regarding the modified saccharide (A-11) and the sucrose (a-1), the modified saccharide (A-13) and the glucose (a-2), and the modified saccharide (A-7) and the fructose (a-3), each of the differences in chemical structure between (A) the modified saccharides and (a) the saccharides was proved by measuring infrared absorption spectra (IR) and molecular-weight distribution curves (RI chart, UV chart).

<Regarding IR Measurement>

Each of the infrared absorption spectra (IR) of (A) the modified saccharides and (a) the saccharides was measured by a reflection method (diamond crystal cell) using an infrared spectrophotometer (manufactured by Thermo Scientific, model name: Nicolet380).

An intensity of a peak at about 2,930 $cm^{-1}$ (C—H stretching vibration of methylene group) is hardly influenced by modification, and therefore this peak was defined as a reference peak.

Figure 2:
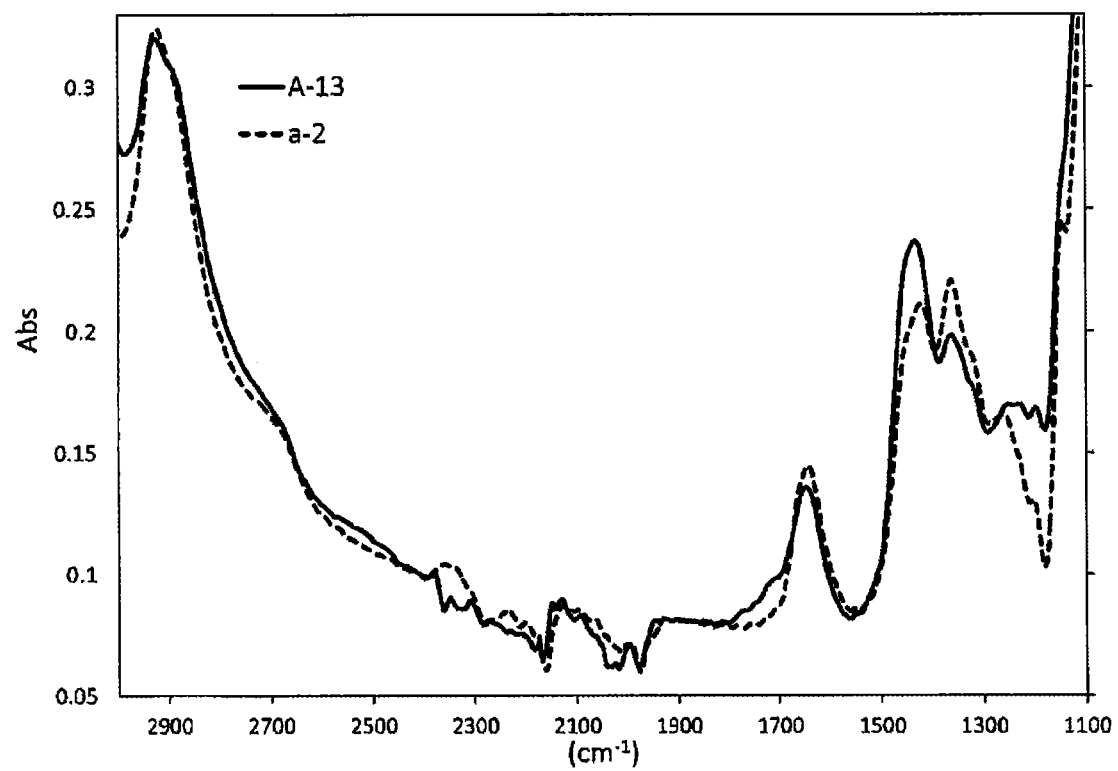
FIG. 2 shows IR of (A-13) a modified saccharide and (a-2) glucose comprised in an aqueous bonding composition of the present invention.
Figure 3:
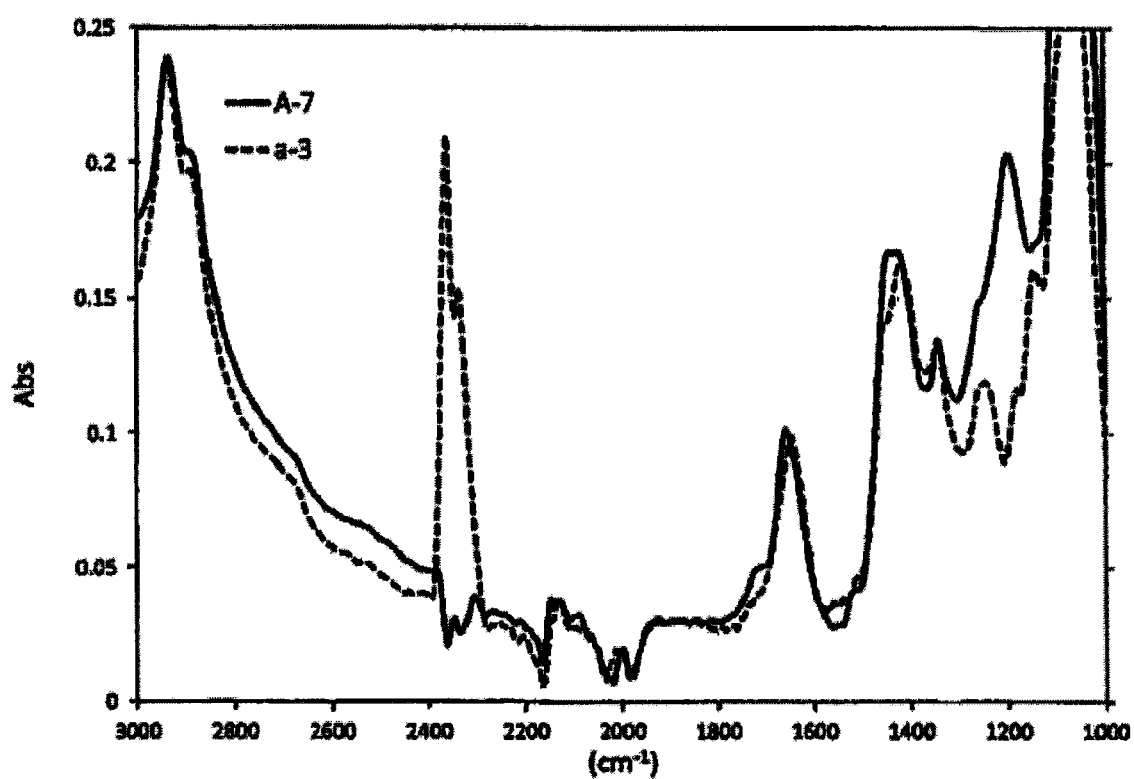
FIG. 3 shows IR of (A-7) a modified saccharide and (a-3) fructose comprised in an aqueous bonding composition of the present invention.

As shown in FIGS. 1 to 3, in the infrared absorption spectra (IR) of (A) the modified saccharides, peaks were observed at about 1,720 $cm^{-1}$ and about 1,200 $cm^{-1}$, and the peaks were assigned to a carbonyl group. These peaks were not observed in the infrared absorption spectra (IR) of (a) the saccharides.

<Measurement of Molecular-Weight Distribution Curve by GPC>

Each of the molecular-weight distribution curves of (A) the modified saccharides and (a) the saccharides was measured by a GPC system (manufactured by Waters Corporation, model name: Alliance e2695). An "RI" (Waters 2417) and a "UV" (Waters 2487) were used as detectors, and a coupled column of Ultra hydrogel 500 and Ultra hydrogel 250 manufactured by Waters Corporation was used as a GPC column.

Using a disodium phosphate and potassium phosphate buffer (0.67 mol/L, pH7.0) as a mobile phase, a sample (each of (A) the modified saccharides and (a) the saccharides) was dissolved in the buffer and the buffer was allowed to flow in the column at a temperature of 40° C., at a flow rate of 0.8 ml/min, and then a molecular-weight distribution curve was measured (a molecular-weight distribution curve obtained by using an RI detector is referred to as an "RI chart", and a molecular-weight distribution curve obtained by using a UV detector is referred to as a "UV chart").

Figure 4:
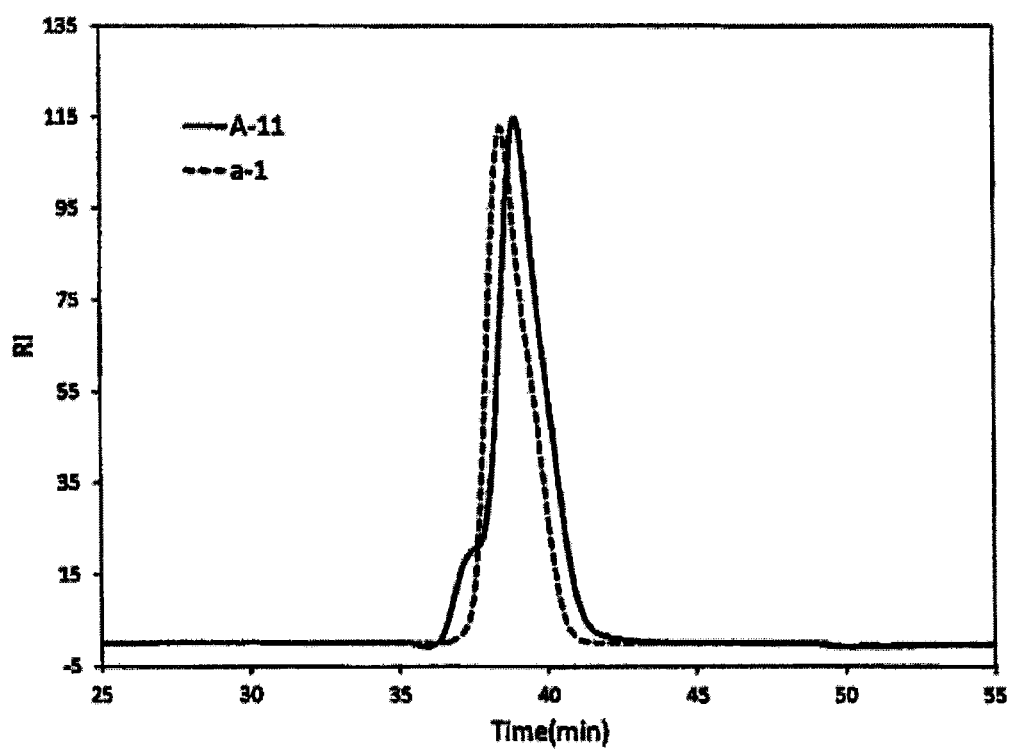
FIG. 4 shows RI charts of gel permeation chromatography (GPC) of (A-11) a modified saccharide and (a-1) sucrose comprised in the aqueous bonding composition of the present invention.
Figure 5:
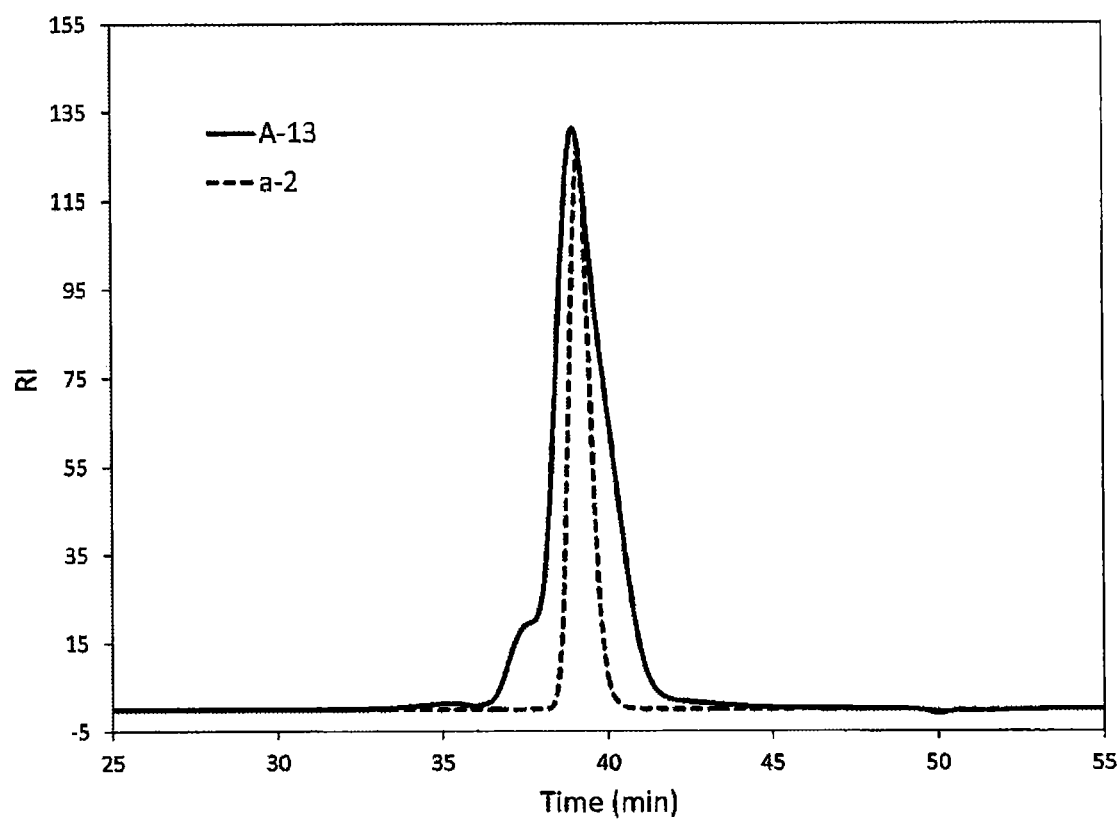
FIG. 5 shows RI charts of GPC of (A-13) a modified saccharide and (a-2) glucose comprised in an aqueous bonding composition of the present invention.
Figure 6:
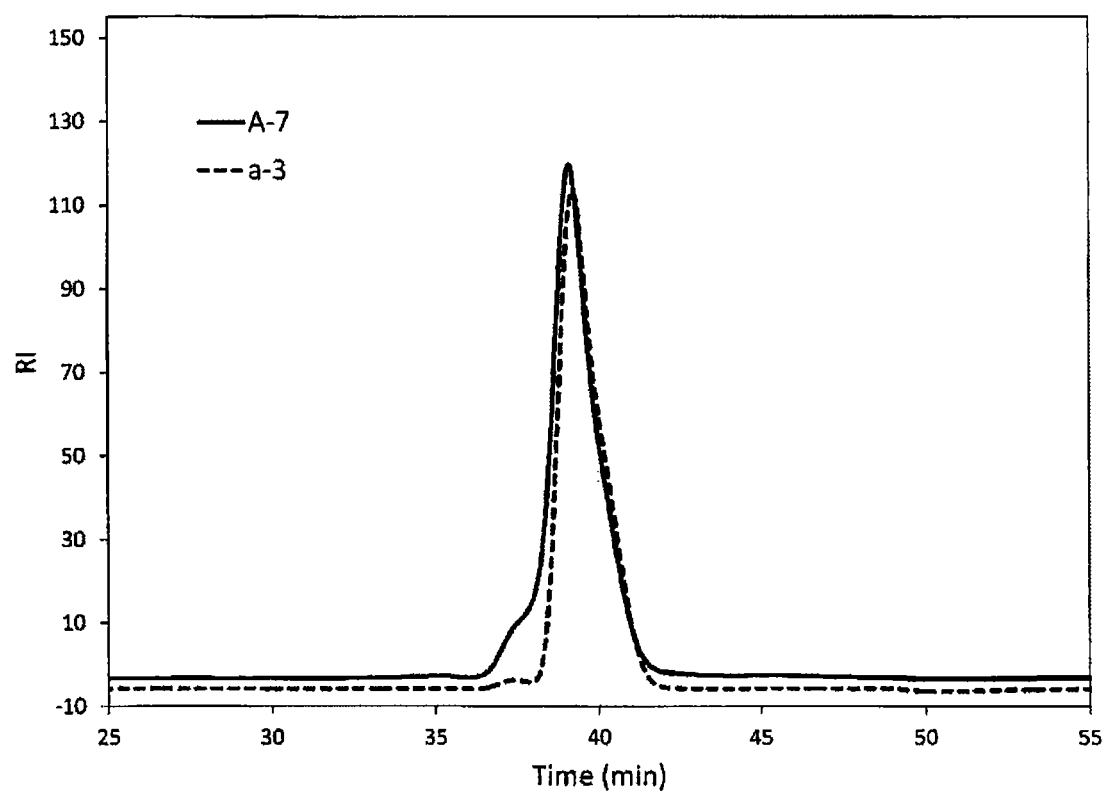
FIG. 6 shows RI charts of GPC of (A-7) a modified saccharide and (a-3) fructose comprised in an aqueous bonding composition of the present invention.

As shown in FIGS. 4 to 6, in each of the RI charts of GPC of (a) the saccharides, one sharp peak corresponding to the molecular weight of each of the saccharides ((a-1) sucrose: 342, (a-2) glucose: 180, (a-3) fructose: 180) was observed.

Meanwhile, in each of the RI charts of (A) the modified saccharides, a shoulder peak was observed at the high molecular weight side for each of the saccharides, thus revealing that a compound having a higher molecular weight was produced. It is considered that the weight average molecular weight of each of the shoulder peak is in a range of 500 to 900.

When compared to the RI chart of the sucrose (a-1) to that of the modified saccharide (A-11), the position of the peak top shifted to the lower molecular weight side in the RI chart of the modified saccharide (A-11). The position of the peak top of this modified saccharide (A-11) nearly corresponds to the peak top of each of the RI charts of the glucose (a-2) and the fructose (a-3). Therefore, it is considered that the modified saccharide (A-11) comprises compounds having further increased molecular weight, which compounds were obtainable by plenty of sucrose being divided into two parts and being recombined.

Figure 7:
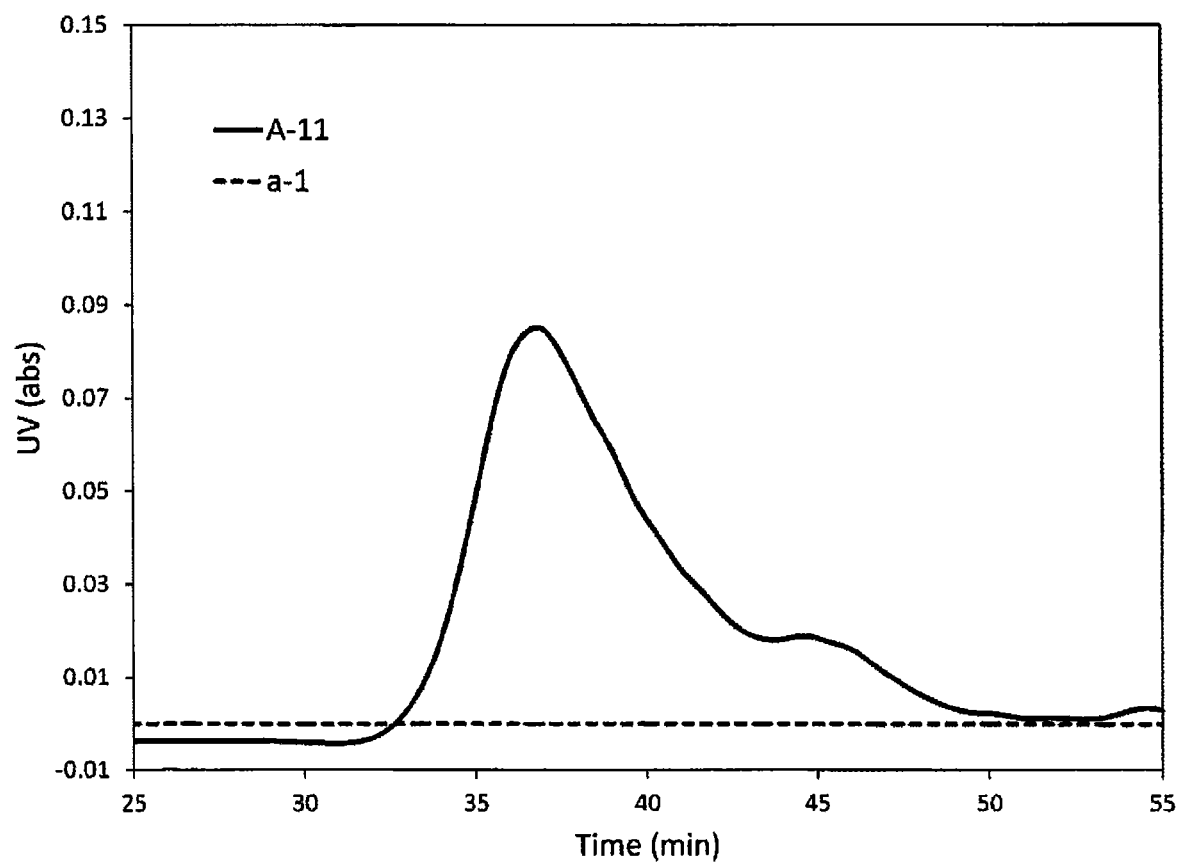
FIG. 7 shows UV charts of GPC of (A-11) a modified saccharide and (a-1) sucrose comprised in an aqueous bonding composition of the present invention.
Figure 8:
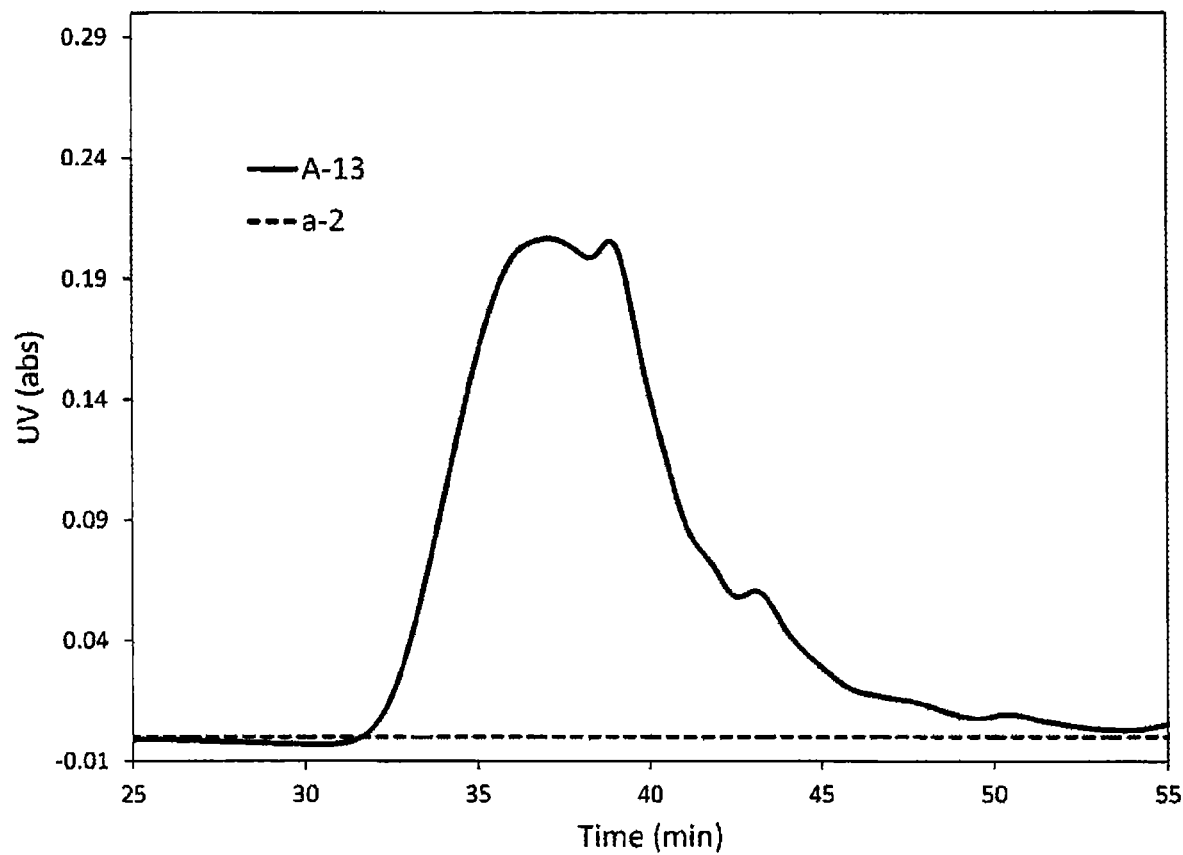
FIG. 8 shows UV charts of GPC of (A-13) a modified saccharide and (a-2) glucose comprised in an aqueous bonding composition of the present invention.
Figure 9:
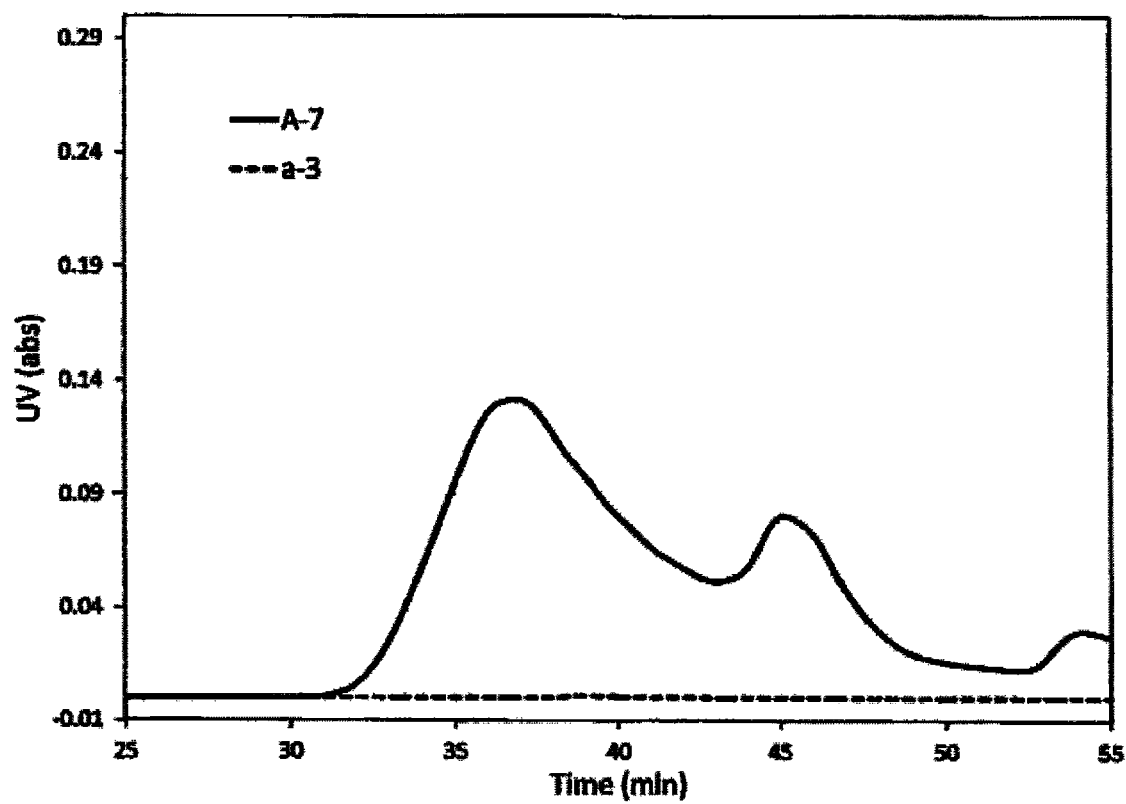
FIG. 9 shows UV charts of GPC of (A-7) a modified saccharide and (a-3) fructose comprised in an aqueous bonding composition of the present invention.

As shown in FIGS. 7 to 9, no peak was observed in each of the UV charts of GPC of (a) the saccharides. The reason is considered that each of the saccharides (a) was not detected by the UV detector since a functional group capable of absorbing UV does not exist in (a) the saccharides.

Meanwhile, in each of the UV charts of (A) the modified saccharides, a broad peak was observed. This fact means existence of a chemical structure capable of absorbing UV, such as a carbonyl group, a vinyl group, and a conjugated structure, and also means that each of (A) the modified saccharides comprising the chemical structure has a molecular weight in a wide range. When each of the positions of the peak tops of the UV charts of (A) the modified saccharides is compared to each of those of the RI charts of (a) the saccharides, each of the positions of the peak tops of the UV charts of (A) the modified saccharides exists at higher molecular weight side, which indicates existence of a compound having a higher molecular weight. It is considered that such high molecular weight compound has a chemical structure, for example, an aldehyde group and a carbonyl group which is produced by oxidizing a hydroxyl group, acetal, and ketal of (a) the saccharides.

According to the above examination, it was proved that a structure not included in each of (a) the saccharides, particularly a structure capable of absorbing UV, was included in each of (A) the modified saccharides, and the molecular weight varies leading to high molecular weight.

<Production of Aqueous Bonding Compositions>

Example 1

To distilled water, 142 g of (A-1) the modified saccharide (solid content of 68% by weight) and 3.6 g of (B-1) diammonium hydrogen phosphate (Wako Pure Chemical Industries, Ltd.) were added. After the mixture was stirred and dissolved at normal temperature, the pH was adjusted in a range of 6.0 to 9.0 using aqueous ammonia to obtain an aqueous bonding composition.

Regarding the aqueous bonding composition of Example 1, as shown in Table 3, the total amount of the solid content of the components (A-1) and (B-1) was 100 parts by weight and the amount of water was 100 parts by weight.

The numerical value of the component (A-1) shown in Table 3 indicates the solid content only.

(Examples 2 to 20) and (Comparative Examples 1 to 7) Production of Aqueous Bonding Compositions Each composition of the aqueous bonding compositions of Examples 2 to 20 and Comparative Examples 1 to 7 is shown in Tables 3 to 5.

Each of the aqueous bonding compositions of Examples 2 to 20 and Comparative Examples 1 to 7 was produced based on each of the compositions shown in Tables 3 to 5 by a method which was the same as that shown in the Example 1.

TABLE 3

| | (Example) | 1 | 2 | 3 | 4 | 5 | 6 | 7 | 8 | 9 | 10 |
|---|---|---|---|---|---|---|---|---|---|---|---|
| (A) Modified saccharide | Sample name | A-1 | A-2 | A-3 | A-3 | A-4 | A-2 | A-2 | A-5 | A-6 | A-7 |
| | Parts of solid content | 95.4 | 96.4 | 98.2 | 100.0 | 96.4 | 96.4 | 96.4 | 96.4 | 89.4 | 96.4 |
| (B) Inorganic acid salt | (B-1) | 4.6 | 3.6 | 1.8 | | 3.6 | | | 3.6 | 10.6 | 3.6 |
| | (B-2) | | | | | | 3.6 | | | | |
| | (B-3) | | | | | | | 3.6 | | | |
| Water | | 100 | 100 | 100 | 100 | 100 | 100 | 100 | 100 | 100 | 100 |
| pH | | 6.3 | 6.7 | 6.2 | 6.5 | 6.8 | 6.0 | 7.6 | 6.5 | 7.1 | 6.2 |
| Total solid content of adhesive | (% by weight) | 50 | 50 | 50 | 50 | 50 | 50 | 50 | 50 | 50 | 50 |
| Gel time | (Seconds) | 163 | 115 | 99 | 130 | 187 | 135 | 170 | 145 | 140 | 160 |
| | 160° C. | B | A | A | A | C | A | B | A | A | B |
| | (Seconds) | 71 | 65 | 65 | 65 | 76 | 66 | 79 | 65 | 65 | 74 |
| | 180° C. | B | A | A | A | B | A | B | A | A | B |
| Elution rate | | 1.5 | 1.4 | 1.7 | 1.3 | 4.2 | 1.8 | 2.3 | 1.5 | 1.4 | 1.5 |
| | | A | A | A | A | B | A | B | A | A | A |
| Tensile strength | (MPa) | 16.5 | 15.6 | 15.3 | 14.1 | 14.3 | 14.5 | 15.2 | 15.3 | 14.3 | 13.5 |
| | | A | A | A | B | B | B | A | A | B | C |
| Tensile elastic modulus | (MPa) | 1,030 | 1,055 | 1,100 | 1,110 | 1,120 | 1,060 | 1,080 | 1,030 | 1,050 | 1,000 |
| | | B | B | A | A | A | B | B | B | B | B |

TABLE 4

| Composition | (Example) | 11 | 12 | 13 | 14 | 15 | 16 | 17 | 18 | 19 | 20 |
|---|---|---|---|---|---|---|---|---|---|---|---|
| (A) Modified saccharide | Sample name | A-8 | A-8 | A-8 | A-9 | A-10 | A-11 | A-11 | A-12 | A-13 | A-14 |
| | Parts of solid content | 96.4 | 96.4 | 96.4 | 96.4 | 96.4 | 100.0 | 98.2 | 96.4 | 89.4 | 96.4 |
| (B) Inorganic acid salt | (B-1) | 3.6 | | | 3.6 | 3.6 | | 1.8 | 3.6 | 10.6 | 3.6 |
| | (B-2) | | 3.6 | | | | | | | | |
| | (B-3) | | | 3.6 | | | | | | | |
| Water | | 100 | 100 | 100 | 100 | 100 | 100 | 100 | 100 | 100 | 100 |
| pH | | 6.3 | 6.7 | 6.0 | 7.6 | 6.2 | 6.5 | 6.8 | 7.4 | 8.2 | 6.5 |
| Total solid content of adhesive | (% by weight) | 50 | 50 | 50 | 50 | 50 | 50 | 50 | 50 | 50 | 50 |
| Gel time | (Seconds) | 104 | 106 | 115 | 132 | 138 | 110 | 102 | 130 | 142 | 139 |
| | 160° C. | A | A | A | A | A | A | A | A | A | A |
| | (Seconds) | <60 | <60 | <60 | 69 | 68 | <60 | <60 | 62 | 65 | 65 |
| | 180° C. | A | A | A | A | A | A | A | A | A | A |
| Elution rate | | 0.4 | 0.4 | 1.5 | 1.8 | 1.6 | 1.9 | 1.1 | 0.4 | 1.4 | 0.7 |
| | | A | A | A | A | A | A | A | A | A | A |
| Tensile strength | (MPa) | 15.6 | 16.3 | 16.5 | 14.8 | 14.4 | 14.1 | 15.1 | 16.1 | 14.3 | 14.5 |
| | | A | A | A | B | B | B | A | A | B | B |
| Tensile elastic modulus | (MPa) | 1,100 | 1,160 | 1,020 | 1,040 | 1,130 | 1,010 | 1,020 | 1,180 | 1,070 | 1,130 |
| | | A | A | B | B | A | B | B | A | B | A |

TABLE 5

| Composition | (Comparative Example) | 1 | 2 | 3 | 4 | 5 | 6 | 7 |
|---|---|---|---|---|---|---|---|---|
| (A) Saccharide (Unmodified saccharide) | Saccharide name | a-1 | a-1 | a-1 | a-2 | a-3 | a-2 | a-1 |
| | Parts of solid content | 89.3 | 89.3 | 89.3 | 89.3 | 89.3 | 85.5 | 72.0 |
| (B) Inorganic acid salt | (B-1) | 10.7 | | | 10.7 | 10.7 | | |
| | (B-2) | | 10.7 | | | | | |
| | (B-3) | | | 10.7 | | | | 9.0 |
| | (B'-4) | | | | | | 14.5 | |
| | (B'-5) | | | | | | | 19.0 |
| Water | | 100 | 100 | 100 | 100 | 100 | 100 | 100 |
| pH | | 8.2 | 6.5 | 7.1 | 8.1 | 8.2 | 7.2 | 8.2 |
| Adhesive Total solid content | (% by weight) | 50 | 50 | 50 | 50 | 50 | 50 | 50 |
| Gel time | (Seconds) | >300 | >300 | 260 | 220 | 265 | >300 | >200 |
| | 160° C. | D | D | D | D | D | D | C |
| | (Seconds) | 101 | 100 | 94 | 92 | 92 | 170 | 97 |
| | 180° C. | D | D | D | D | D | D | D |
| Elution rate | | 4.6 | 4.8 | 5.7 | 2.5 | 2.4 | 1.2 | 4.5 |
| | | C | C | C | B | B | A | C |
| Tensile strength | (MPa) | 13.5 | 13.1 | 13.8 | 14.2 | 10.4 | 13.2 | 9.7 |
| | | C | C | C | B | D | C | D |
| Tensile elastic modulus | (MPa) | 1,050 | 1,000 | 1,040 | 1,020 | 870 | 1,005 | 850 |
| | | B | B | B | B | D | B | D |

Regarding the aqueous bonding compositions of Examples and Comparative Examples, performances thereof were evaluated. Evaluation items and evaluation criteria are as follows.

<Measurement of Curing Rate: Gel Time>

In accordance with JIS6910 method B, a gel time at 160° C. and a gel time at 180° C. were measured. The evaluation criteria are shown below. Evaluation criteria of the gel time (160° C.)

A: less than 150 seconds
B: 150 seconds or more and less than 180 seconds
C: 180 seconds or more and less than 210 seconds
D: 210 seconds or more Evaluation criteria of the gel time (180° C.)

A: less than 70 seconds
B: 70 seconds or more and less than 80 seconds
C: 80 seconds or more and less than 90 seconds
D: 90 seconds or more <Water Resistance: Elution Rate Test>

By adding water to each of the aqueous bonding compositions, each solid component concentration (or solid content) was adjusted to 33% by weight to obtain each sample composition for evaluation.

The sample composition (0.5 ml) was uniformly applied onto a glass fiber filter (Whatman, product name: GF/A) having a weight of about 0.05 g cut into a square shape in size of 30 mm×30 mm.

The sample composition on the glass fiber filter was dried at 105° C. for 30 minutes and then left to stand in an oven at 190° C. for 15 minutes to obtain a specimen (after treatment at 190° C.).

The specimen (after the treatment at 190° C.) was immersed in 50 ml of water at normal temperature for 24 hours and then dried at 130° C. for 1 hour to obtain a specimen (after water immersion treatment). After the immersion in water, a ratio (Equation 1) of the adhesive existing in the specimen was determined, an elution rate (Equation 2) of the adhesive to the water having immersed the same was also determined, and then water resistance was evaluated.

Equation 1

Ratio of adhesive existing in specimen=[specimen after water immersion treatment−weight of glass fiber filter]/[specimen after treatment at 190° C.−weight of glass fiber filter]

Equation 2

Elution rate (%)=(1−ratio of adhesive existing in specimen)×100

The evaluation criteria of the water resistance based on the elution rate are shown below.
A: less than 2.0%
B: 2.0% or more and less than 4.5%
C: 4.5% or more and less than 6.0%
D: 6.0% or more <Mechanical Properties: Measurement of Tensile Strength and Tensile Elastic Modulus>

By adding water to each of the aqueous bonding compositions, each solid component concentration (or solid content) was adjusted to 33% by weight to obtain each sample composition for evaluation.

The sample composition (1.0 ml) was uniformly applied onto a glass fiber filter (Whatman, product name: GF/A) having a weight of about 0.10 g cut into a rectangular shape in size of 20 mm×100 mm.

The sample composition on the glass fiber filter was dried at 105° C. for 30 minutes and then left to stand in an oven at 190° C. for 15 minutes to obtain a specimen.

The specimen was placed in a thermo-hygrostat (23° C., humidity of 50%) and left to stand for 2 hours, and then a tensile test was performed. Using a tensile tester, model 5585, manufactured by Instron Corporation, a tensile strength and a tensile elastic modulus were measured at a tensile speed of 25.4 mm/min. The tensile strength was defined as a breaking strength (maximum strength) value.

The evaluation criteria of the tensile strength (23° C., humidity of 50%) are as follows.
A: Strength is 15 MPa or more.
B: Strength is 14 MPa or more and less than 15 MPa.
C: Strength is 12 MPa or more and less than 14 MPa.
D: Strength is less than 12 MPa.

The tensile elastic modulus was determined from the gradient of the strain amount of 0.1% excluding the slack of the specimen.

The evaluation criteria of the tensile elastic modulus (23° C., humidity of 50%) are as follows.
A: Elastic modulus is 1,100 MPa or more.
B: Elastic modulus is 1,000 MPa or more and less than 1,100 MPa.
C: Elastic modulus is 900 MPa or more and less than 1,000 MPa.
D: Elastic modulus is less than 900 MPa.

As shown in Tables 3 and 4, each of the aqueous bonding compositions of Examples 1 to 20 comprises (A) a modified saccharide, each of the curing rate is high. Particularly, regarding the aqueous bonding compositions of Examples 11 to 20, each of (A) the modified saccharides was produced in the presence of (c) an amine, thus proving that the curing rate is more increased. Furthermore, each of the glass fiber molded articles of Examples 1 to 20 is satisfactory in all tensile strength, tensile elastic modulus, and water resistance. Particularly, each of the glass fiber molded articles of Examples 11 to 20 achieves low elution rate and is extremely excellent in water resistance.

Meanwhile, as shown in Table 5, each of the aqueous bonding compositions of Comparative Examples 1 to 7 does not comprise (A) a modified saccharide, thus proving that the curing rate is significantly low, and production efficiency of a molded article is decreased. Each of the glass fiber molded articles of Comparative Examples 1 to 7 is inferior in all tensile strength, tensile elastic modulus, and water resistance, compared to the molded articles of Examples.

INDUSTRIAL APPLICABILITY

The present invention provides an aqueous bonding composition. The aqueous bonding composition according to the present invention is used when wood-based elements and inorganic fibers such as glass fibers are molded.

The invention claimed is:
1. An aqueous bonding composition comprising:
(A) a modified saccharide prepared by reacting (a) a saccharide selected from the group consisting of sucrose, glucose, fructose and mixtures thereof, with (b) a peroxide in the presence of (c) ammonia,
wherein the modified saccharide (i) is linear in structure, (ii) comprises aldehyde group or carbonyl group, and (iii) has a higher weight average molecular weight than the (a) saccharide.
2. The aqueous bonding composition according to claim 1, further comprising (B) an inorganic acid salt.
3. The aqueous bonding composition according to claim 2, wherein the inorganic acid salt (B) comprises an inorganic acid ammonium salt.
4. A molded article comprising inorganic fibers and a cured material of the aqueous bonding composition according to claim 1.

* * * * *